Feb. 20, 1945.  E. GISONDI  2,369,962
FASTENING DEVICE
Filed Aug. 14, 1943  2 Sheets-Sheet 1
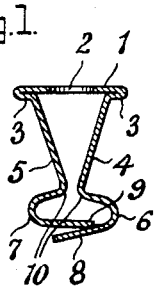
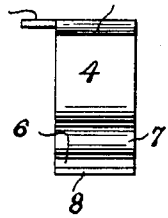
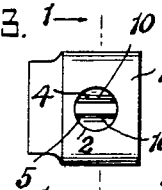
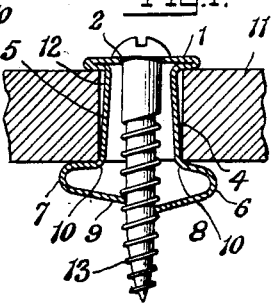
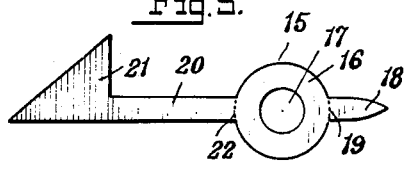
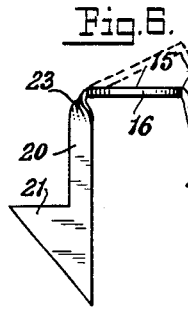
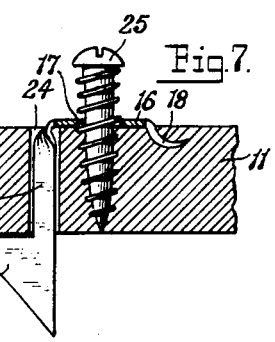
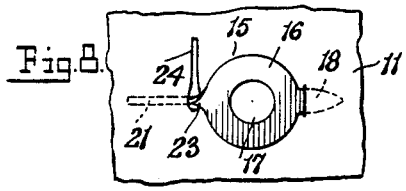
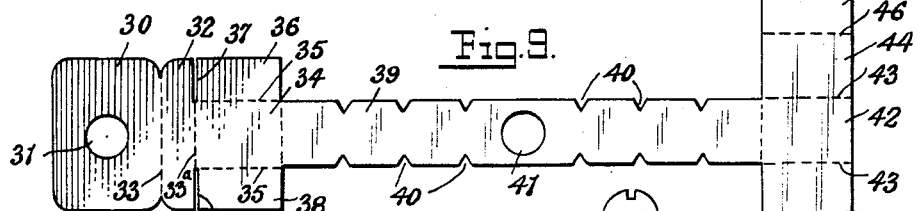
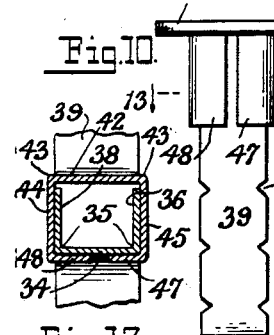
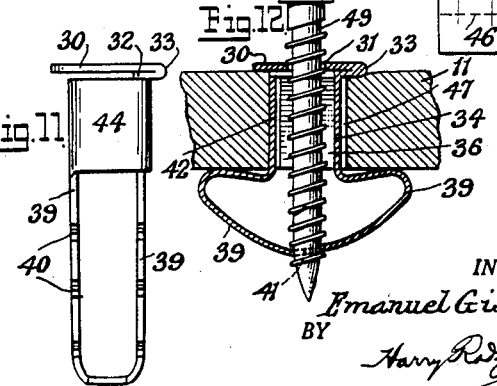
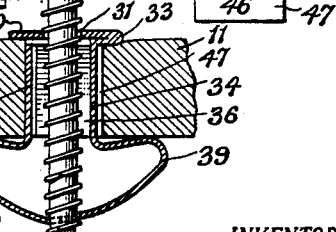
INVENTOR.
Emanuel Gisondi
BY Harry Radzinsky
Attorney.

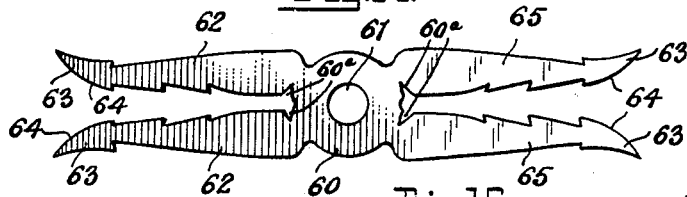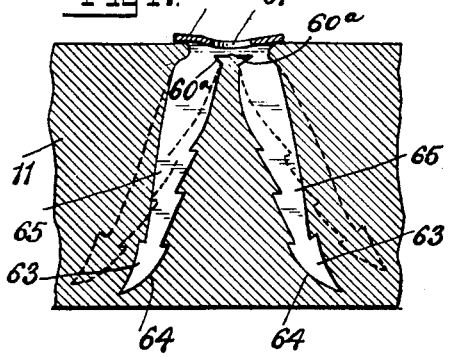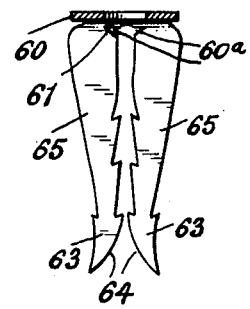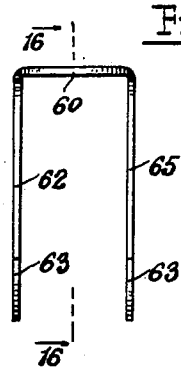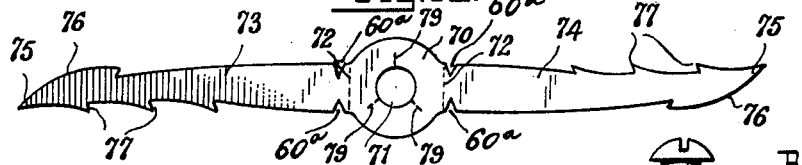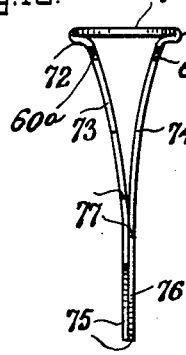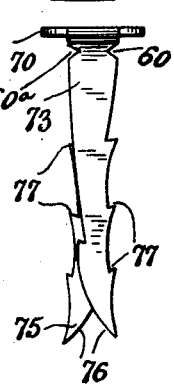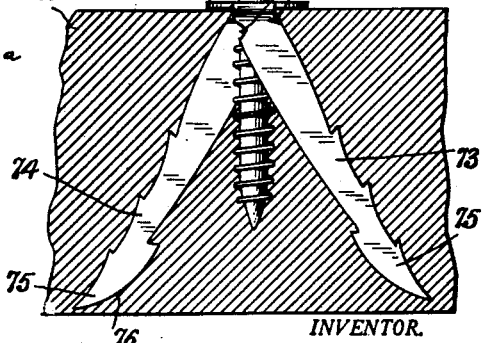

Patented Feb. 20, 1945

2,369,962

UNITED STATES PATENT OFFICE 2,369,962

FASTENING DEVICE

Emanuel Gisondi, Larchmont, N. Y.

Application August 14, 1943, Serial No. 498,713

4 Claims. (Cl. 85—5)

This invention relates to fastening devices, and particularly to those adapted for attaching elements to walls and ceiling surfaces.

One of the obstacles in building construction is the difficulty met with in attaching elements to walls and ceilings because of the nature of the material of which the surfaces are made. This is particularly true of plastered walls; it is even more apparent when the walls are made of any one of the many types of sheet material popular in building construction at the present time. The fibrous, soft and compressible material of which many of these so-called "wall boards" are made renders it difficult, if not altogether impossible, to securely anchor nails, screws or other known types of fasteners in them, so that in most cases when it is desired to fasten an article to walls made of these materials it is necessary to locate the fastening device in such a position that it will enter either a stud or some other solid part of the framing structure at the back of the sheet material. This is not always possible and as a result has made the attachment of elements to such sheet materials decidedly unsatisfactory.

Efforts have been made in the past to provide fastening devices for sheet materials or wall boards of the character mentioned, most of such prior devices including either elements which have to be clenched over behind the sheet material, or else included nuts which had to be attached to bolts or other threaded elements, at the back of the sheet material. Such devices are not satisfactory because they not only require a great deal of time to put them in place, but the back of the sheet material where "clenching-over" or nut-fitting operations were required, was not always accessible to the workman with the result that such devices could not be used except under favorable conditions.

The object of the present invention is to provide a fastening device capable of being used in various kinds of sheet materials such as wall boards and the like, plaster, and many other substances, and which may be placed in position from one face only of the materials in which it is applied. The improved device acts as an anchorage for a wood screw, bolt, corrugated nail or the like which, because of its firm engagement by the anchorage, can securely fasten any desired element to the wall or other surface.

In the accompanying drawings, forming a part hereof, Fig. 1 is a vertical sectional view, taken on the line 1—1 of Fig. 3 looking in the direction of the arrows, of one form of anchorage made in accordance with the invention; Fig. 2 is a side elevation of the same; Fig. 3 is a plan view of the same; Fig. 4 is a vertical sectional view through the anchorage, showing the same extending through a piece of wall board or the like and acting to receive a wood screw, or similar threaded element; Fig. 5 is a top plan view of a blank from which another form of anchorage is made; Fig. 6 is a side elevation of an anchorage made from the blank shown in Fig. 5; Fig. 7 is a sectional view through the anchorage of Fig. 6, showing the same extending through a piece of wall board and receiving a screw or other similar threaded fastener; Fig. 8 is a top plan view of the structure of Fig. 7, except that the screw is not shown. Fig. 9 is a face view of a blank from which a third embodiment of the invention is constructed; Fig. 10 is a side view of an anchorage made from said blank; Fig. 11 is a view taken at right angles to that of Fig. 10; Fig. 12 is a sectional view through the anchorage of Figs. 10 and 11, showing the same extending through a piece of wall board and receiving a wood screw or other threaded fastener; Fig. 13 is a sectional view on the line 13—13 of Fig. 10, looking in the direction of the arrows, and with the legs of the notched strip bent out laterally; Fig. 14 is a face view of the blank from which a fourth embodiment of the invention is made; Fig. 15 is an end view of said embodiment; Fig. 16 is a sectional view on the line 16—16 of Fig. 15, looking in the direction of the arrows; Fig. 17 shows the anchorage driven into a piece of wall board or other wall surfacing and in readiness to receive a screw, nail, bolt or other fastener; Fig. 18 is a face view of a blank from which a fifth embodiment of the invention is made; Fig. 19 is an edge view of the same; Fig. 20 is a view taken at right angles to that of Fig. 19, and Fig. 21 is a sectional view through a piece of wall board or other wall surfacing, showing the anchorage driven therein and receiving a wood screw or other fastener.

The devices shown in the several illustrated embodiments of the invention are all adapted for the same primary purpose, namely, to receive a screw, nail, bolt or other fastener and hold it securely and firmly, thereby enabling said fastener to firmly attach trim, fittings, or any other desired article or thing to the surface of the wall in which the anchorage is located.

Referring to the embodiment of the invention disclosed in Figs. 1 to 4 inclusive, the anchorage member is made from a single strip of relatively thin and fairly resilient sheet metal, and is provided with a central portion or head 1, having an aperture or hole 2, through which a wood screw 13, a bolt or other threaded element, or a corrugated nail, is adapted to pass. I have found that when the hole is made in the correct size it will threadably engage the threads of a wood screw or bolt regardless of the fact that the anchorage in which the hole is formed is of thin metal.

At its opposite sides, the head 1 is doubled over and bent inwardly, as indicated at the two points 3 in Fig. 1, to provide the two similar downwardly extending legs 4 and 5 which normally converge inwardly, as clearly seen in Fig. 1. The leg 4 is bent outwardly, as indicated at 10, and is then bent inwardly as at 6 to form a hooked end 8. The second leg 5 is similarly bent outwardly at 10 and then bent inwardly at 7 to provide a hooked end 9. It will be noted that the anchorage, before being used, has the two hooked ends 8 and 9, which form resilient fingers, in overlapped relation, with the end designated at 8 disposed on the outside of the end 9.

The manner in which the anchorage is used is clearly seen in Fig. 4. Therein a section of wall board or other similar sheet material is shown at 11, and is provided with an aperture or hole 12 readily punched in it by a suitable tool in the hands of the workman. The anchorage, in the condition shown in Fig. 1, is forced through the hole 13, which is smaller than the head 1, until the head abuts against the outer face of the sheet material.

The anchorage has its legs 4 and 5, between the head and the bends 10, of such length as to permit the hooked ends or fingers 8 and 9 to be disposed at the back of the sheet material. In other words, the length of the legs between the head and bends 10 will correspond substantially to the thickness of the sheet material or wall board in which the fastener or anchorage is used. After the anchorage has been inserted in the hole 12 as just explained, a screw 13, bolt, or other threaded element, or corrugated nail, may be inserted through the hole 2. The pointed end of the screw or other fastener, coming into contact with the bends 10, will spread the legs 4 and 5 apart, and finally coming into contact with the hooked ends 8 and 9, will separate these ends sufficiently to be threaded past them, said ends however, being resiliently operative against the threaded shank of the screw and holding it against axial withdrawal except by a manual unthreading movement. Thus, the screw or other threaded element, used for attaching an article to the wall, will be very firmly held against withdrawal by the engagement of the spring fingers 8 and 9 against it, yet it may be unthreaded and re-inserted whenever desired. Since the action of the screw on the fingers 8 and 9 tends to spread them apart, the anchorage is securely held in the hole 12 by engagement of the sheet material 11 between the head 1 and the fingers 8 and 9.

In the structure shown in Figs. 5 to 8 inclusive, the construction of the anchorage member will be clear from the blank of Fig. 5. The blank is provided with a head or annulus portion 15 having a central hole or aperture 17 adapted to thread on the shank of a screw 25, bolt or other threaded element.

Extending from the annulus portion 15 is an integral shank portion 20 terminating in a triangular enlargement or barb 21. Extending radially from the annulus 15, at a point diametrically opposite to the shank 20, is a pointed prong 18. To form the blank of Fig. 5 into operative shape as clearly shown in Figs. 6 and 7, the prong 18 is bent rearwardly on the line 19 to the position substantially shown in Fig. 6. The shank 20 is also bent rearwardly, on the line 22, and is also twisted as at 23 so that its plane now extends substantially at right angles to the plane when in its former position in the blank. To place the anchorage member of this embodiment in position, a slit 24 is punched through the wall board, said slit being long enough to permit the passage of the triangular piece or barb 21. After the shank 20 is pushed through the slit until the barb has completely passed through the slit and is located at the back of the wall board, the anchorage is then turned bodily within the slit until the barb 21 extends crosswisely of the slit, as shown in Figs. 7 and 8. A blow from a hammer now drives the head 15 against the face of the wall board and sinks the prong 18 into the board. It will be noted that the prong 18 normally turns outwardly and as it is driven into the wall board it tends to curl or clench over therein. The barb 21 extends crosswisely of the slit 24 and thus cannot be withdrawn therethrough, and this, co-operating with the prong 18, prevents shifting movement of the anchorage and holds the anchorage securely in place. The hole 17, engaging the threads of the screw, bolt or other threaded element 25, holds such element securely in place and prevents axial movement of it except by manual removal. The position of the parts, and especially that of the part 15 before being applied to the wall board, is as shown in dotted lines in Fig. 6 wherein it will be noted that the head 15 is disposed at an angle to the shank to thereby permit the prong 18 to clear the face of the wall board while the shank 20 is being rotated in the hole 24.

Another embodiment of the invention is illustrated in Figs. 9 to 12 inclusive. The blank from which this embodiment is made is shown in Fig. 9, and is formed at one end with a head portion 30 having a central screw hole 31. An under-piece 32 forms an integral continuation of the head, and when the blank is folded on the dotted line 33, this under-piece extends beneath the head as clearly seen in Fig. 11. A part 34 extends integrally from the under-piece, and said part is provided with two lateral wings 36 and 38 separated from the under-piece by the slits 37. Extending from the part 34 is a lengthy notched strip 39, the spaced notches 40 in the side edges of the strip constituting points at which the strip may selectively bend or buckle according to the thickness of the wall board through which the anchorage extends. At a central point in its length, the strip 39 is provided with a screw hole 41, and at the end of said strip is a head 42 adapted to be folded on the several spaced parallel lines 43 and 46 as hereafter explained.

The anchorage of this embodiment of the invention, ready for insertion through a hole in the wall board, is shown in Figs. 10 and 11. It will be there seen that the blank of Fig. 9 has been folded upon the dotted line 33 to position the under-piece 32 beneath the head 30. The blank has also been folded on the line 33a so that the part 34 now extends downwardly from the under-piece 32. By folding the part 34 on the parallel lines 35, the wings 36 and 38 are extended inwardly and parallel to one another. The strip 39 is doubled on itself into U-shape and the head 42 is thus brought over to a position below the head 30. By folding the head 42 on the several fold lines 43 and 46, a box-like enclosure, having side walls 44 and 45 and inturned ends 46 and 47, is the result. Said box-like structure, clearly seen in Fig. 13, extends around and encloses the U-shaped structure formed by the folded part 34. The resultant device consists of a head 30 provided with the central screw hole 31 and a stiffened square shank portion made up of the folded parts 34 and 42, and from which extends the looped strip 39 provided with the screw hole 41 located in axial alignment with the hole 31.

In applying this anchorage, a hole is punched in the wall board with a suitable tool and the anchorage, then in the shape shown in Figs. 10 and 11, is pushed through the hole until the head 30 abuts against the face of the wall board 11. A screw 49 or other threaded fastener, or a corrugated nail is now threaded or driven through the aligned holes 31 and 41, and as the screw is tightened, the strip 39 will be buckled upon the line of several of the notches 40 and bowed to the position shown in Fig. 12. Thus, the bowed portion so formed will provide a head or enlargement on the inside of the wall board and hold the anchorage in place. Since the overlapped folded parts 34 and 42 form a substantially square shank on the anchorage, and which is forced through a round hole in the wall board, the device will be effectively prevented from rotation in the hole while the screw 49 is being tightened.

In the embodiment of Figs. 14 to 16 inclusive is shown a pronged member adapted to be driven into the wall board. The blank from which this type of anchorage is made is shown in Fig. 14 wherein it will be seen that the same is formed with a central head portion 60 having the hole 61 for receiving a threaded screw or other fastener. Extending from each side of the head 60 is a pair of barbed prongs, those at one side being indicated at 62 and those at the other side being shown at 65. Each of these prongs is notched or weakened near the head as indicated at 60a. The prongs are bent laterally from the head to form the anchorage into hairpin or U-shape. When the device is driven into the wall board or other similar material, the prongs on each side of the anchorage will spread apart as shown in Fig. 17. The notches 60a form weakened points at which the prongs can bend outwardly to an extent indicated in dotted lines in Fig. 17 or even to a greater extent. This spreading action is caused by the shape of the prongs and the notches 60a and is aided by the barbed heads 63 which have the divergent edges 64. The spreading action of the prongs will firmly anchor the device in the wall board, its withdrawal therefrom being strongly resisted by the notched edges of the prongs. When the device has been driven into place, as shown in Fig. 17, a screw or other threaded fastening element may be threaded into engagement with the hole 61 and into the body of the wall board.

In Fig. 18 is shown a blank from which another type of "driven-in" anchorage is formed. This device has the central head 70 provided with the screw-receiving hole 71, and extending radially from the head are the two diametrically opposite prongs 73 and 74, which are also notched as at 60a. These prongs are bent at 72, adjacent to the head 70, to cause them to project beneath and then extend downwardly from the head as clearly seen in Fig. 19. This provides a two-pronged metal nail which can be readily driven into the wall board 11, and when so driven, the prongs 73 and 74 will spread apart as shown in Fig. 21. The barbed ends 75 on the prongs, provided with the divergent edge surfaces 76 and the notches 60a facilitate the desired spreading action, and the spread of the prongs, coupled with the teeth 77 thereon, prevents withdrawal of the anchorage out of the wall board. A screw 78 or other equivalent fastener is threaded into the wall board through the hole 71 threadably engaging the screw and holding it from axial withdrawal out of the wall board except by manual unthreading movement.

It will be noted that in the several embodiments of the invention, the screw holes, indicated respectively at 2, 17, 31, 41, 61 and 71, are shown as being formed in relatively thin sheet metal. The resiliency of the thin metal surrounding these holes enables the screw, and particularly if it is the relatively coarse-threaded wood screw, or the so-called "self-tapping" screw, to be tightly engaged in the hole. However, it may in some cases be found desirable, and particularly when a corrugated nail instead of a screw is used, to provide means for even more positively engaging the screw or nail, and in such cases the hole can be provided with several radial slits, such as indicated in dotted lines at 79 in Fig. 18. This arrangement can, of course, be employed in connection with any of the embodiments of the invention herein described.

Each of the devices described is intended to firmly hold a screw or other fastener very securely, and to anchor itself with extraordinary tenacity in the wall board regardless of the nature of the material of which the wall is constructed. It will also be noted that in each case, the device is adapted for placement in the wall from one side only so that access to the back of the wall is unnecessary.

What I claim is:

1. A fastener for low density sheet material such as wall-board and the like, comprising, a sheet-metal member having a head provided with a screw-hole, a pair of legs integrally extending from the head and normally converging toward one another, said legs being adapted to be extended through an opening in the wall-board, each leg being provided near its free end with a hook-shaped part, said hook-shaped part being of a size to provide a relatively flat shoulder operative against the back of the wall-board when the legs are spread apart, a screw extending through the screw-hole and having its threaded shank operative against the tips only of the hook-shaped parts of the legs, said tips engaging under the thread on the screw at different points along the shank of the same and preventing withdrawal of the screw except by manual rotation of it.

2. A fastener for low density sheet material such as wall-board and the like, comprising, a sheet-metal member having a head portion formed with a screw-hole, a pair of elongated spring fingers extending rearwardly and convergently from the head and adapted to pass through an opening in the wall-board, each finger being formed with an enlarged hook-shaped end located at the back of the wall-board when the fingers are extended through the opening therein, said hook-shaped ends normally overlapping each other when the fastener is not in use, each of said hook-shaped ends having a distinct flat shoulder for engagement against the back of the wall-board adjacent to the opening therein, and a threaded fastener for threadably engaging the hole in the head, said fastener being engaged by the extreme ends of the hook-shaped parts, said engagement acting to spread the fingers apart and causing the flat shoulder portions thereon to engage against the back of the wall-board.

3. A fastening device of the character described comprising, a sheet metal member provided with a pair of spring fingers integrally connected at one end by a bridge-piece constituting a head for the fastening device, said fingers normally converging from the head, said head being apertured to receive a screw, the fingers being hooked and providing overlapping ends, the hooked parts forming lateral shoulders adjacent their juncture with the converging fingers, said converging fingers providing means located between the ends and the head for engagement by the screw to cause the shoulders to be spread apart and the overlapping ends to separate to permit passage of the screw between them.

4. A fastening device of the character described comprising, a sheet metal member having a head provided with an aperture through which a threaded member is extended, a pair of resilient fingers extending rearwardly from the head and adapted to be spread apart by the threaded member, the fingers normally converging from the head before the threaded member is inserted between the same, each finger having an outwardly bowed part inwardly of its free end presenting a shoulder operative against the rear face of a wall board when the fastener is inserted therethrough and the threaded member is in place, the tips of the fingers being normally overlapped but adapted to engage the shank of the threaded member when spread apart by the fastener, the converging fingers having parts located between their bowed portions and the head for engagement by the threaded member to cause separation of the tips of the fingers and to permit the entry of the threaded member between said tips.

EMANUEL GISONDI.